Figure 1:
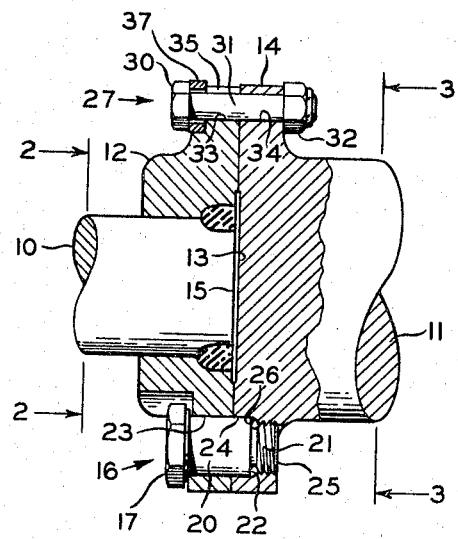

June 27, 1967 T. F. GUNDLACH 3,328,058

SHAFT COUPLING

Filed June 29, 1964

INVENTOR.
THEODORE F. GUNDLACH
BY Cohn and Powell
ATTORNEY.

United States Patent Office 3,328,058
Patented June 27, 1967

3,328,058
SHAFT COUPLING
Theodore F. Gundlach, Belleville, Ill., assignor to T. J. Gundlach Company, Belleville, Ill., a corporation of Illinois
Filed June 29, 1964, Ser. No. 378,631
3 Claims. (Cl. 287—129)

This invention relates generally to an improved shaft coupling, and more particularly to an improved mechanism for transmitting torque between coupling plates and for maintaining the associated shafts in alignment.

In many of the heretofore conventional shaft couplings, the abutting plates had interfitting tongue and groove, key or flange connections that served to hold the shafts in axial alignment. Moreover, such prior couplings had a multiplicity of parts such as clamping plates that had to be disassembled and removed incident to the disconnection of the coupling plates. It is a major objective of the present improvements to afford a coupling structure in which the plates are not interconnected by any similar interfitting face surfaces, but rather are assembled only by a plurality of special bolt connections that serve the dual function of transmitting torque and maintaining shaft alignment.

An important object is realized by the structural arrangement of a pair of substantially smooth coupling plates disposed in face to face relation, and a plurality of shoulder bolts interconnecting the plates, the bolt shanks extending freely through one plate and extending freely partially through the other plate, the shanks and plates having a close fit so as to transmit torque between the plates and to maintain the shafts in axial alignment.

Another important object is achieved by the provision of shoulder bolts each of which has a large unthreaded or substantially smooth shank portion and a relatively reduced threaded portion, the large smooth shank portions extending freely through the one plate and extending freely partially through the other plate with a close fit in order to provide the torque transmission and shaft alignment features mentioned previously, while the threaded portions are secured to the said other plate to clamp the plates toegther.

Yet another important object is attained by constructing the shoulder bolts so that each has a head and a large diameter smooth shank with a reduced threaded end. The large diameter smooth shanks extend freely into, yet with a close fit, compatible large diameter openings provided in the plates, while the heads engage the outside of one plate and the ends threadedly engage the other plate, such structural arrangement enabling the functional advantages discussed previously.

An important object is achieved by the provision of a plurality of circumferentially spaced clamping bolts extending through the plates and cooperating with the heretofore described shoulder bolts to clamp the coupling plates together. Other advantages are realized by alternately arranging the shoulder bolts and clamping bolts circumferentially on the plates about the axis of the shafts.

Another important object is realized by the placement of the clamping bolts through aligned and circumferentially spaced holes formed in the plates, the holes in one plate having lateral peripheral openings through which the associated clamping bolts can be selectively moved incident to placement in or removal from the holes upon assembly or disassembly respectively of the coupling.

Still another important objective is afforded by the provision of a countersunk recess in the said one plate about each clamping bolt hole, and of a washer located about each clamping bolt and located in the associated recess to retain the bolt in the hole and to preclude removal from the peripheral opening until the washer is removed from the recess.

An important objective is to provide a coupling that is simple and durable in construction, economical to manufacture, highly efficient in operation, and which is capable of being assembled or disassembled by anyone with little or no instructions.

Figure 2:
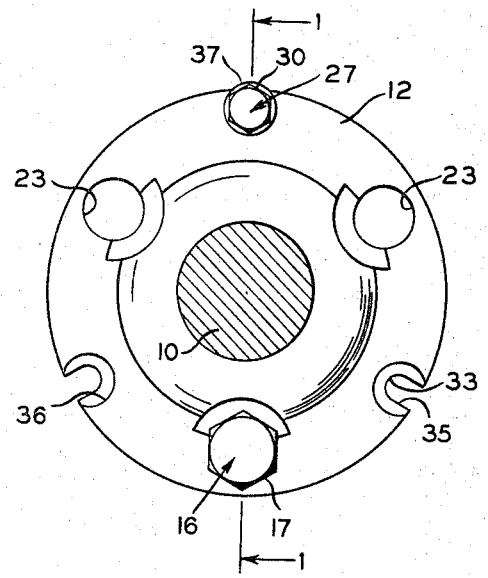
Figure 3:
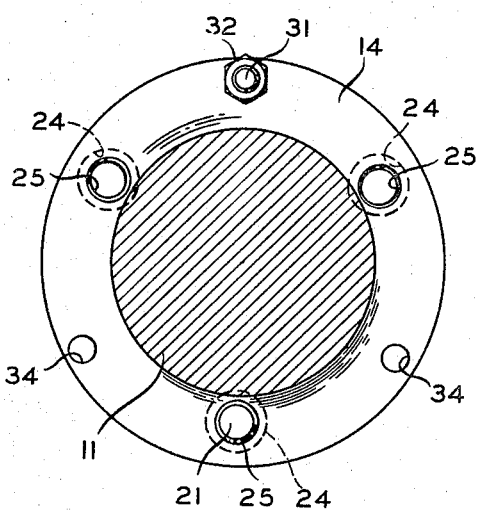

FIG. 1 is a cross sectional view of the shaft coupling as seen along line 1—1 of FIG. 2;
FIG. 2 is a side elevational view as seen along line 2—2 of FIG. 1; and
FIG. 3 is a side elevational view as seen along line 3—3 of FIG. 1.

Referring now by characters of reference to the drawings, and first to FIG. 1, it is seen that the coupling is used to interconnect operatively a pair of shafts 10 and 11. For example, the shaft 10 can be operatively connected to a power drive unit such as an electric motor (not shown), while the driven shaft 11 can be operatively connected to a crushing roll (not shown) of a crushing machine. The coupling serves to hold the shafts 10 and 11 in axial alignment and serves to transmit a driving torque therebetween so that rotation of the drive shaft 10 will cause a responsive and coinciding rotation of the driven shaft 11.

The coupling includes a circular plate 12 that is fixed to the end of drive shaft 10 as by welding or the like. The plate 12 is provided with a substantially smooth and flat face 13.

Similarly, the coupling includes another plate 14 having a circular configuration which is fixed to the end of the driven shaft 11 as by welding. The coacting plate 14 is provided with a substantially smooth and flat face 15.

In assembly, the plates 12 and 14 are disposed with their inner faces 13 and 15 in face to face abutting relation and with the axes of shafts 10 and 11 in alignment. These coupling plates 12 and 14 are interconnected such that driving torque is transmitted therebetween and such that the shafts 10 and 11 are maintained in axial alignment.

This connecting means includes a plurality of shoulder bolts generally indicated at 16 which are utilized to interconnect the coupling plates 12 and 14 effectively and efficiently. Each shoulder bolt 16 includes a head 17 of substantially hexagonal shape to accommodate the usual type of tool such as a wrench, and a relatively large diameter, elongate shank 20 having a substantially smooth periphery, and a relatively reduced threaded end 21. A forwardly facing abutment 22 is provided at the end of the large diameter shank 20, the abutment 22 being formed by the differences in diameters of the relatively large diameter shank 20 and the relatively small diameter threaded end 21.

The coupling plate 12 is provided with a plurality of circumferentially spaced openings 23, the openings 23 being of relatively large diameter and defined by a substantially smooth cylindrical margin. These large diameter openings 23 extend completely through the plate 12 and are adapted to receive the relatively large diameter shanks 20 of the shoulder bolts 16. For reasons which will later appear, the shoulder bolt shanks 20 extend freely through the large diameter openings 23, yet have a relatively close fit.

The other coupling plate 14 is provided with a plurality of circumferentially spaced large diameter openings 24 that are directly aligned with the compatible large diameter openings 23 in coupling plate 12 when the plates 12 and 14 are disposed in face to face relation. As is best seen in FIG. 1, the large diameter openings 24 extend only partially through the coupling plate 14. It will be noted that the large diameter openings 24 are defined by relatively smooth peripheral margins to accommodate the large diameter shanks 20 of shoulder bolts 16. The bolt shanks 20 extend freely into the large diameter openings 24, yet have a relatively close fit.

Formed in the coupling plate 14 are a plurality of threaded bores 25 that communicate with the ends of the large diameter plate openings 24. These bores 25 have a relatively reduced diameter to receive and accommodate the reduced threaded ends 21 of the shoulder bolts 16. Because of the differences in diameters of each large opening 24 and its associated threaded bore 25, an inwardly facing abutment 26 is formed, the abutment 26 defining the inner end of the large opening 24 and being adapted to engage the coacting abutment 22 of the bolt shank 20 disposed in such large opening 24.

When the plates 12 and 14 are disposed in face to face relation with the large openings 23 and 24 in direct alignment, the shoulder bolts 16 are inserted and attached. Specifically, the shank 20 of each shoulder bolt 16 is inserted through the conforming large diameter opening 23 in coupling plate 12 and inserted into the associated large diameter opening 24 in the coupling plate 14. Then, the shoulder bolts 16 are turned with a suitable tool applied to the bolt heads 17 so as to engage the reduced shank ends 21 with the threaded bores 25. When the shoulder bolts 16 are effectively attached, the bolt heads 17 will engage the outer surface of coupling plate 12, the bolts 16 serving to clamp the coupling plates 12 and 14 together. Moreover, because of the relatively close fit of the bolt shanks 20 in the aligned and associated large diameter openings 23 and 24, the shoulder bolts 16 serve to hold the shafts 10 and 11 in axial alignment, and also serve to transmit a driving torque between the coupling plates 12 and 14. It will be importantly understood that these shoulder bolts 16 provide a multiple function because of their particular structural arrangement with the coupling plates 12 and 14 as described previously.

Also interconnecting the coupling plates 12 and 14 are a plurality of clamping bolts generally indicated by 27. Each of the clamping bolts 27 includes a head 30 of a generally hexagonal shape suitable to receive a tool such as a wrench, and an elongate cylindrical shank 31 that is threaded at one end. A nut 32 is threadedly attached to the shank end.

The mating plates 12 and 14 are provided with a plurality of aligned holes 33 and 34 extending completely therethrough. These holes 33–34 are circumferentially spaced respectively about the coupling plates 12 and 14 and are arranged alternately with the large diameter openings 23 and 24. The shank 31 of each clamping bolt 27 is inserted through each pair of aligned plate holes 33 and 34 so that the bolt head 30 engages the outer surface of coupling plate 12. Then, the nut 32 is applied to the threaded shank end so that the plates 12 and 14 are clamped tightly together.

Each of the clamping bolt holes 33 provided in the coupling plate 12 has a lateral opening 35 leading to the periphery of plate 12. These lateral openings 35 enable selectively the placement or removal of the clamping bolt shanks 31 laterally through the periphery of the plate 12 into or from the clamping bolt holes 33. The clamping bolts 27 can be maintained in connection with the coupling plate 14 by their placement through the plate holes 34 and by the threaded engagement of the nuts 32 on the shank ends.

The outer surface of coupling plate 12 is provided with a plurality of recesses 36 around each of the clamping bolt holes 33. These recesses 36 are substantially circular in configuration and are adapted to receive compatible circular washers 37 fitted around the clamping bolt shank 31. When the washers 37 are located in the recesses 36, the clamping bolts 27 cannot be moved laterally through openings 35, and consequently cannot be removed in this manner from the plate holes 33. In order to withdraw the bolt shanks 31 through the lateral openings 35, the nuts 32 must be removed and the washers 37 shifted axially along the shanks 31 and out of the recesses 36.

It is thought that the operation of this shaft coupling has become fully apparent from the foregoing detailed description of parts, but for completeness of disclosure, the assembly and resultant functions will be briefly described. It will be assumed that this shaft and coupling unit is utilized in a machine in which it is at times desirable to disassemble the coupling quickly and easily without disturbing the placement and axial alignment of one or the other of shafts 10 and 11.

To assemble the coupling, the plates 12 and 14 are arranged in face to face relation with the large diameter openings 23 and 24 in direct alignment. In this position, the clamping bolt holes 33 and 34 are automatically disposed in alignment, also. Then, the shoulder bolts 16 are applied with the shanks 20 extending through the large diameter openings 23 and into the large diameter openings 24. The shoulder bolts 16 are turned to engage the threaded and reduced ends 21 in the threaded bores 25 until the plates 12 and 14 are clamped together. Because of the close fit of the large diameter shanks 20 in the large diameter openings 23 and 24, the axes of shafts 10 and 11 are held in alignment. Moreover, the engagement of these large shoulder bolt shanks 20 between and with the coupling plates 12 and 14 enable these shoulder bolts 16 to transmit driving torque between the plates 12 and 14.

Then, the clamping bolts 27 are inserted through the plate holes 33 and 34, and the nuts 32 are applied to the shank ends and tightened so as to clamp the plates together. A washer 37 is fitted over each bolt shank 31 and is located in a compatible recess 36 upon tightening of the clamping bolts 27. The coupling is now fully assembled.

To disassemble the coupling, the shoulder bolts 16 are turned in a direction to disengage the threaded and reduced ends 21 with the threaded bores 25, and are then removed. The nuts 32 on the clamping bolts 27 are removed and the washers 37 are moved axially along the bolt shanks 31 and out of the recesses 36. Then, the bolt shanks 31 are moved out of the plate holes 34 and are moved laterally out of the plate holes 33 through the lateral openings 35. The coupling plates 12 and 14 are now disassembled.

To reassemble the coupling, the plates 12 and 14 are disposed again in face to face relation and the clamping bolt shanks 31 are moved laterally through the peripheral openings 35 and into the plate holes 33, and are moved axially through the plate holes 34, and the nuts 32 are tightened so that the washers 37 will seat in the plate recesses 36. Then, the shoulder bolts 16 are inserted and tightened in a manner described previously.

Although the invention has been described by making detailed reference to a single preferred embodiment, such detail is to be understood in an instructive, rather than in any restrictive sense, many variants being possible within the scope of the claims hereunto appended.

I claim:

1. In a coupling for a pair of shafts comprising:
   (a) a pair of plates attached to the shafts and disposed in face to face relation,
   (b) a plurality of circumferentially spaced shoulder bolts, each bolt having a large diameter substantially smooth shank portion and a smaller diameter threaded end portion,
   (c) the substantially smooth shank portions extending through compatible openings provided in one plate and partially through compatible openings provided in the other plate,
   (d) the reduced end portions threadedly engaging the said other plate,
   (e) the smooth shank portions and compatible openings having a close fit so that the shoulder bolts transmit torque between the plates and also maintain the shafts in axial alignment,
(f) a plurality of circumferentially spaced clamping bolts extending through the plates and clamping the plates together, the clamping bolts having shank portions, and
(g) the diameter of the shank portion of each shoulder bolt is substantially larger than the diameter of the shank portion of the clamping bolts.

2. A coupling as defined in claim 1, in which:
(h) the shoulder bolts and clamping bolts are alternately arranged circumferentially on the plates about the axis of the shafts.

3. A coupling as defined in claim 1, in which:
(h) the plates are provided with a plurality of circumferentially spaced and aligned holes therethrough receiving the clamping bolts,
(i) the holes in one plate communicating with the periphery of the plate to enable selectively the placement or removal of the clamping bolts laterally through the periphery of such plate into or from the holes,
(j) the said one plate is provided with a countersunk recess about each hole in said plate, and
(k) a washer is located about each clamping bolt and is disposed in the associated recess to retain the clamping bolt in the hole and to preclude removal through the peripheral opening until the washer is removed from the recess.

References Cited

UNITED STATES PATENTS

| | | | |
|---|---|---|---|
| 790,767 | 5/1905 | Walsh | 285—368 X |
| 1,740,617 | 12/1929 | Morgan | 64—9 |
| 2,338,758 | 1/1944 | Fast | 64—9 |
| 2,676,279 | 4/1954 | Wilson | 287—129 X |
| 2,768,847 | 10/1956 | Peyrin et al. | 285—368 |
| 2,986,908 | 6/1961 | Wilkerson | 64—9 |

FOREIGN PATENTS 651,188  3/1951  Great Britain.

CARL W. TOMLIN, *Primary Examiner.*

T. F. CALLAGHAN, *Assistant Examiner.*